(12) United States Patent
Lee

(10) Patent No.: US 10,761,546 B2
(45) Date of Patent: Sep. 1, 2020

(54) ANTI-SCALDING WATER OUTLET DEVICE

(71) Applicant: LUNAL CORP., Taipei (TW)

(72) Inventor: Hui-Lung Lee, Taipei (TW)

(73) Assignee: LUNAL CORP., Taipei (TW)

( * ) Notice: Subject to any disclaimer, the term of this patent is extended or adjusted under 35 U.S.C. 154(b) by 92 days.

(21) Appl. No.: 16/174,295

(22) Filed: Oct. 30, 2018

(65) Prior Publication Data

US 2020/0133318 A1 Apr. 30, 2020

(51) Int. Cl.
*G05D 23/19* (2006.01)

(52) U.S. Cl.
CPC .................... *G05D 23/19* (2013.01)

(58) Field of Classification Search
CPC ........ E03C 1/055; G05D 23/19; G05D 23/20; G05D 23/22; G05D 23/24; G05D 23/26; G05D 23/27

See application file for complete search history.

(56) References Cited

U.S. PATENT DOCUMENTS

| | | | |
|---|---|---|---|
| 4,696,428 A * | 9/1987 | Shakalis | G05D 23/1393 137/607 |
| 4,854,499 A * | 8/1989 | Neuman | E03C 1/04 236/93 B |
| 4,965,894 A * | 10/1990 | Baus | E03D 9/085 4/605 |
| 5,944,255 A * | 8/1999 | Shirmohamadi | G05D 23/1393 236/12.12 |
| 6,317,717 B1 * | 11/2001 | Lindsey | E03C 1/055 137/559 |
| 6,438,770 B1 * | 8/2002 | Hed | E03C 1/05 236/12.12 |
| 6,691,338 B2 * | 2/2004 | Zieger | E03C 1/021 4/605 |
| 6,955,333 B2 * | 10/2005 | Patterson | G06Q 20/327 251/129.04 |
| 7,584,898 B2 * | 9/2009 | Schmitt | E03C 1/05 137/359 |
| 10,274,971 B2 * | 4/2019 | Song | G05B 13/048 |
| 10,392,786 B2 * | 8/2019 | Lance | F16K 11/22 |
| 10,441,960 B2 * | 10/2019 | Rogers | B05B 1/1627 |
| 10,449,558 B2 * | 10/2019 | Thurgood | B05B 1/3026 |
| 2001/0048811 A1 * | 12/2001 | Waithe | F24D 19/1051 392/474 |

(Continued)

*Primary Examiner* — Nelson J Nieves
(74) *Attorney, Agent, or Firm* — Leong C. Lei

(57) ABSTRACT

An anti-scalding water outlet device, including: a main body adapted to allow water to flow through; a control circuit board adapted to set a temperature parameter value; a temperature sensor, in connection with the control circuit board and adapted to sense water temperature inside the main body; and a solenoid valve, in connection with the control circuit board and adapted to use as a water flow switch of the main body, when the solenoid valve is opened to allow water to flow out of the main body, the control circuit board obtaining water temperature information transmitted from the temperature sensor; when the water temperature exceeds the set temperature parameter value, the control circuit board issuing a command to close the solenoid valve and stop waterflow of the main body, thereby preventing high temperature water from scalding users.
Therefore, the present invention is safe and practical.

6 Claims, 4 Drawing Sheets

(56) References Cited

U.S. PATENT DOCUMENTS

| | | | | |
|---|---|---|---|---|
| 2003/0125842 | A1* | 7/2003 | Chang | E03C 1/0409 |
| | | | | 700/282 |
| 2006/0231638 | A1* | 10/2006 | Belz | G05D 23/1393 |
| | | | | 236/12.12 |
| 2008/0000997 | A1* | 1/2008 | Smith | E03C 1/0408 |
| | | | | 236/12.1 |
| 2008/0203195 | A1* | 8/2008 | Schmitt | E03C 1/0408 |
| | | | | 239/548 |
| 2009/0293189 | A1* | 12/2009 | Somerville | B05B 1/18 |
| | | | | 4/597 |
| 2009/0293190 | A1* | 12/2009 | Ringelstetter | E03C 1/057 |
| | | | | 4/605 |
| 2011/0259454 | A1* | 10/2011 | Tsai | E03C 1/0408 |
| | | | | 137/565.17 |
| 2013/0340162 | A1* | 12/2013 | Peel | B05B 1/18 |
| | | | | 4/676 |
| 2015/0308084 | A1* | 10/2015 | Thompson | G05D 23/1393 |
| | | | | 700/283 |
| 2016/0362877 | A1* | 12/2016 | Thomas | F16K 31/082 |
| 2018/0216325 | A1* | 8/2018 | Chen | G05D 23/1905 |
| 2019/0094893 | A1* | 3/2019 | Jurczyszak | G05D 23/1393 |
| 2019/0101944 | A1* | 4/2019 | Main | G05D 23/1313 |
| 2019/0234054 | A1* | 8/2019 | Strushensky | B05B 12/10 |

\* cited by examiner

ANTI-SCALDING WATER OUTLET DEVICE

(A) TECHNICAL FIELD OF THE INVENTION

The present invention relates to a water outlet device, and more particularly to a safe anti-scalding water outlet device, which may be a faucet, shower head, drinking water dispenser outlet, emergency shower, eye washer or the like.

(B) Description of the Prior Art

Taking water faucets as an example, they are used to the flow-out or shut-down of water. Conventional faucets mostly have a cold water, hot water effluent function, and users may rotate a faucet rod to control the mixing ratio of cold water and hot water and thereby to control the temperature of the water flowing out of a faucet.

Conventional faucet present certain risks during practical use. For example, water temperature adjustment is important when bathing, and the water temperature 38° C., called tepid water, usually is the most comfortable water temperature for bathing and not too hot or too cold. But, the water flowing out of conventional faucets will often become colder or hotter without adjustment because of unstable water heaters, or users turn the faucet rod to hot water end carelessly, causing high temperature water (hot water) to flow out of faucets suddenly to scald the users who cannot react in time.

In addition, some naughty and active children is easy to touch the hot water rod inadvertently when bathing, causing hot water to flow out suddenly to scald them. Probably, natural and man-made calamities will sometimes cause cold water supply to be malfunctioned and only hot water to be supplied to water outlet devices to make users scalded.

SUMMARY OF THE INVENTION

The present invention proposes a safe anti-scalding water outlet device, which may be a faucet, shower head, drinking water dispenser outlet, emergency shower, eye washer or the like, the present invention is proposed.

One object of the present invention is to provide an anti-scalding water outlet device having anti-scalding safety by sensing and cutting off high temperature water flow.

Another object of the present invention is to provide an anti-scalding water outlet device, capable of being not only a faucet product but a showerhead, drinking water dispenser, emergency shower or the like, or in combination with a showerhead, drinking water dispenser, emergency shower or the like, which may also have a very high practicality.

To achieve the objects mention above, the present invention proposes an anti-scalding water outlet device, including: a main body, adapted to allow water to flow through; a control circuit board, adapted to a set temperature parameter value; a temperature sensor, in connection with the control circuit board and adapted to sense water temperature inside the main body; and a solenoid valve, in connection with the control circuit board and adapted to use as a water flow switch of the main body, when the solenoid valve is opened to allow water to flow out of the main body, the control circuit board obtaining water temperature information transmitted from the temperature sensor; when the water temperature exceeds the set temperature parameter value, the control circuit board issuing a command to close the solenoid valve and stop waterflow of the main body, thereby preventing high temperature water from scalding.

Therefore, the present invention is safe and practical.

DETAILED DESCRIPTION OF THE PREFERRED EMBODIMENTS

Figure 1:
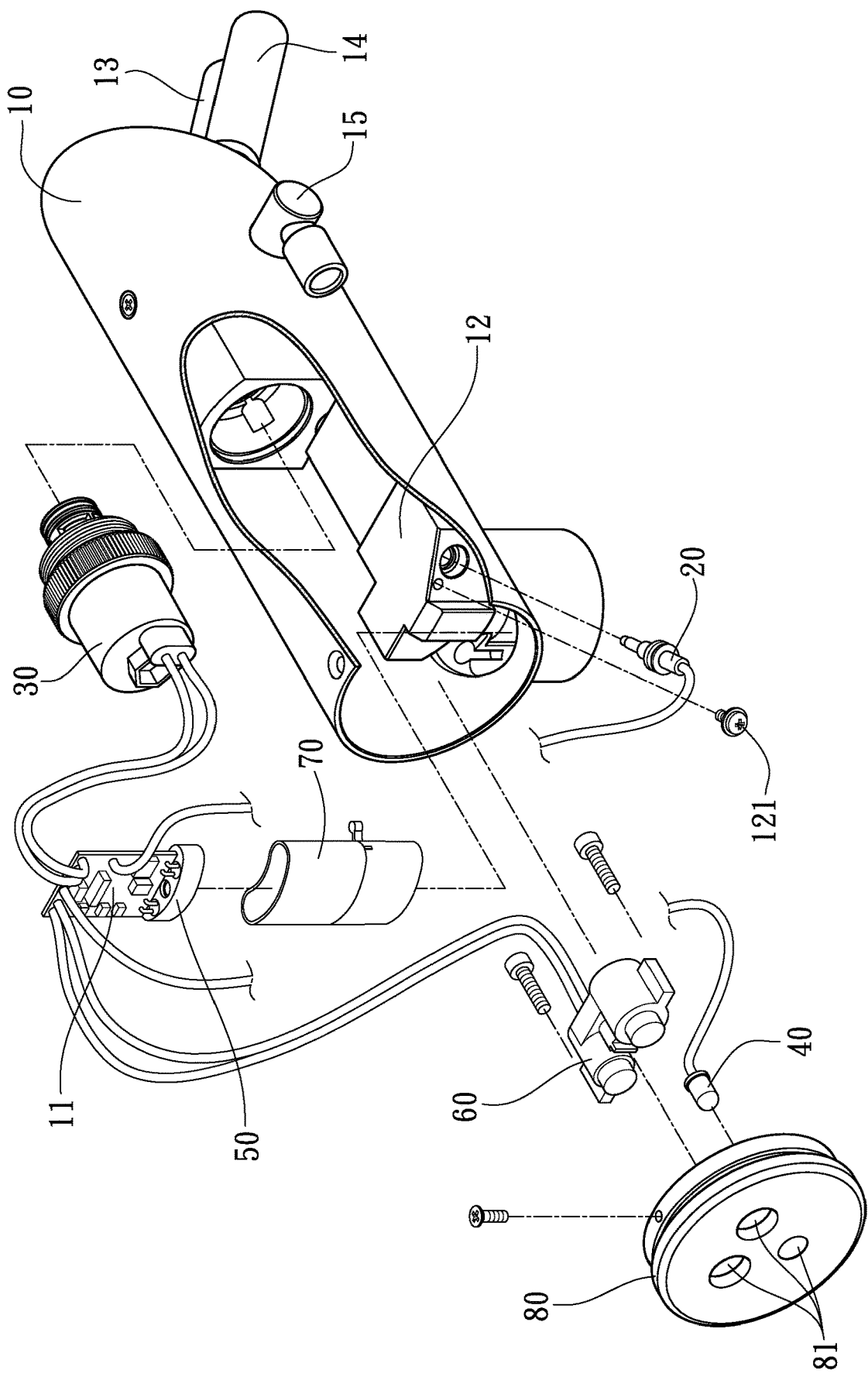
FIG. 1 is an exploded view of a preferred embodiment of the present invention made into a water faucet.
Figure 2:
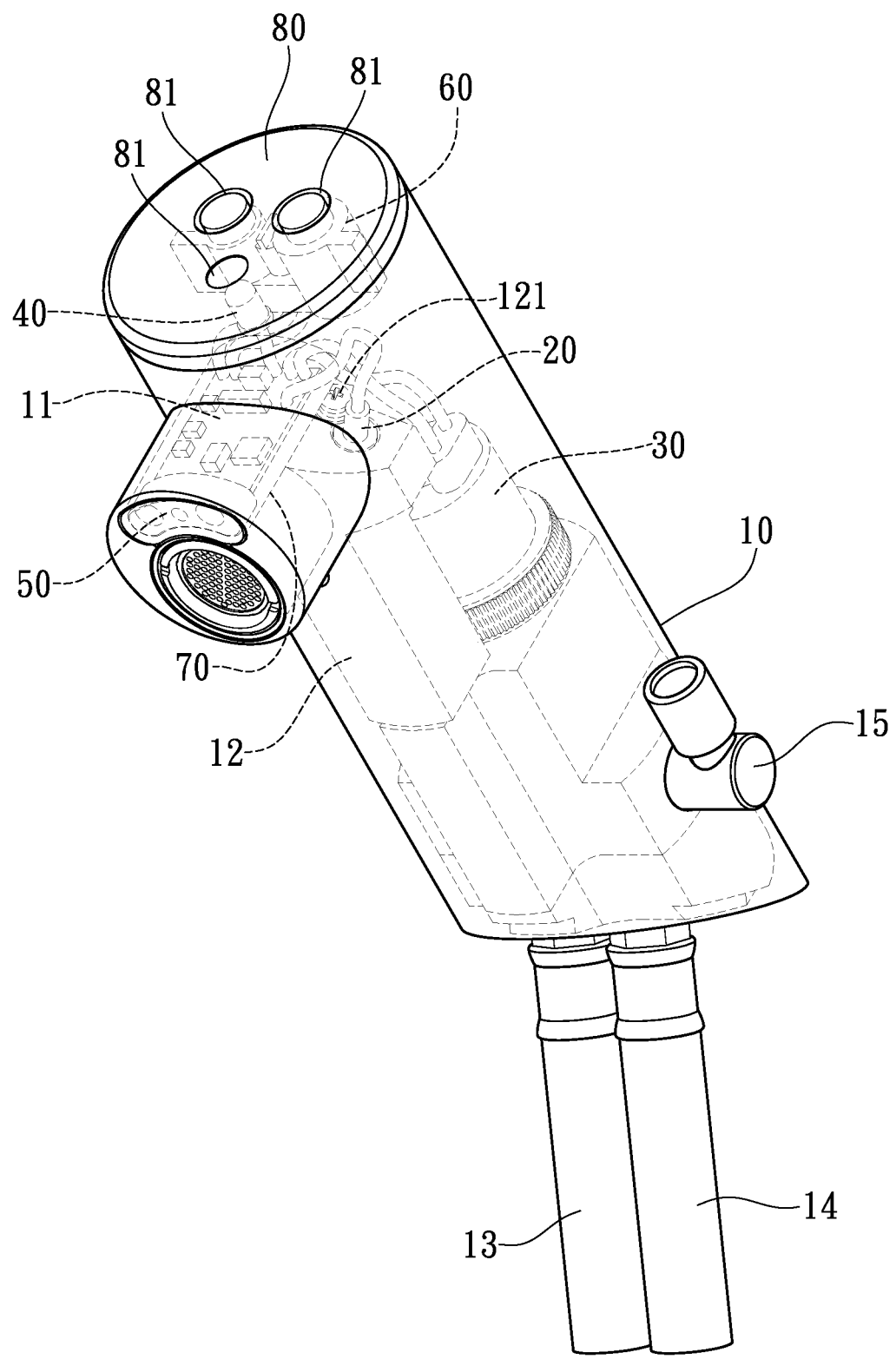
FIG. 2 is a perspective view of the water faucet.
Figure 3:
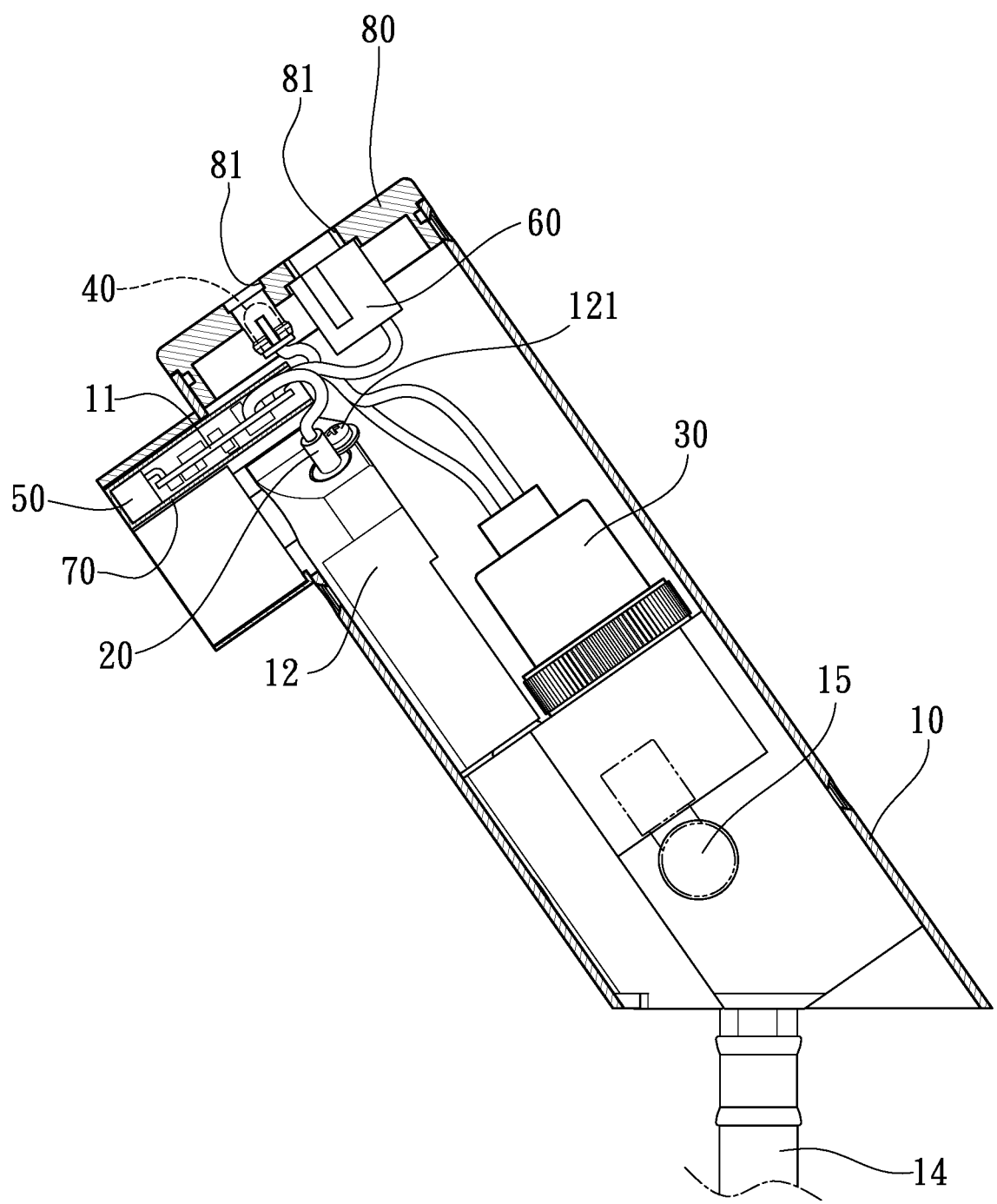
FIG. 3 is a cross-sectional view of the faucet.

Referring to FIGS. 1, 2 and 3, an anti-scalding water outlet device of the present invention, in a preferred embodiment, is made into a water faucet, and the structure thereof includes a main body 10, temperature sensor 20 and solenoid valve 30.

The main body 10 is provided with a control circuit board 11 adapted to a set temperature parameter value.

The temperature sensor 20 is in connection with the control circuit board 11 and adapted to sense the temperature of the water inside the main body 10.

The solenoid valve 30 is in connection with the control circuit board 11 and adapted to use as a water flow switch of the main body 10.

The inside of the main body 10 is configured with a seat 12, in a concave portion of which a screw 121 is used to press and fix the temperature sensor 20 together with a washer.

Furthermore, a hot water pipe 13 and a cold water pipe 14 are configured on the lower side of the main body 10, and a cold and hot water rod 15 adapted to control the mixing ratio of the hot and cold water of the pipes 13, 14 in a rotational manner is configured on a lateral side of the main body 10.

The control circuit board 11 is further in connection with a lamp 40, first infrared sensor 50 and second infrared sensor 60, where the lamp 40 may be an LED lamp.

Furthermore, both the control circuit board 11 and first infrared sensor 50 are configured in a protective cover 70 adapted to protect them, and the control circuit board 11, first infrared sensor 50 and protective cover 70 on one side of the inside of the main body 10, with the main body 10 allowing the sensing light of the first infrared sensor 50 to penetrate it to carry out sensing.

One end of the main body 10 is covered with an end cover 80 having a plurality of through holes 81, and the lamp 40 and second infrared sensor 60 are configured correspondingly to the plurality of through holes 81 and further on the end of the main body 10. Whereby, the plurality of through holes 81 allow the sensing light of the second infrared sensor 60 to pass through to carry out sensing and users to observe the illumination of the lamp 40.

The above is the introduction of components of the present invention and the combination thereof, and the use examples, features and benefits of the present invention will further be described as follows.

Figure 4:
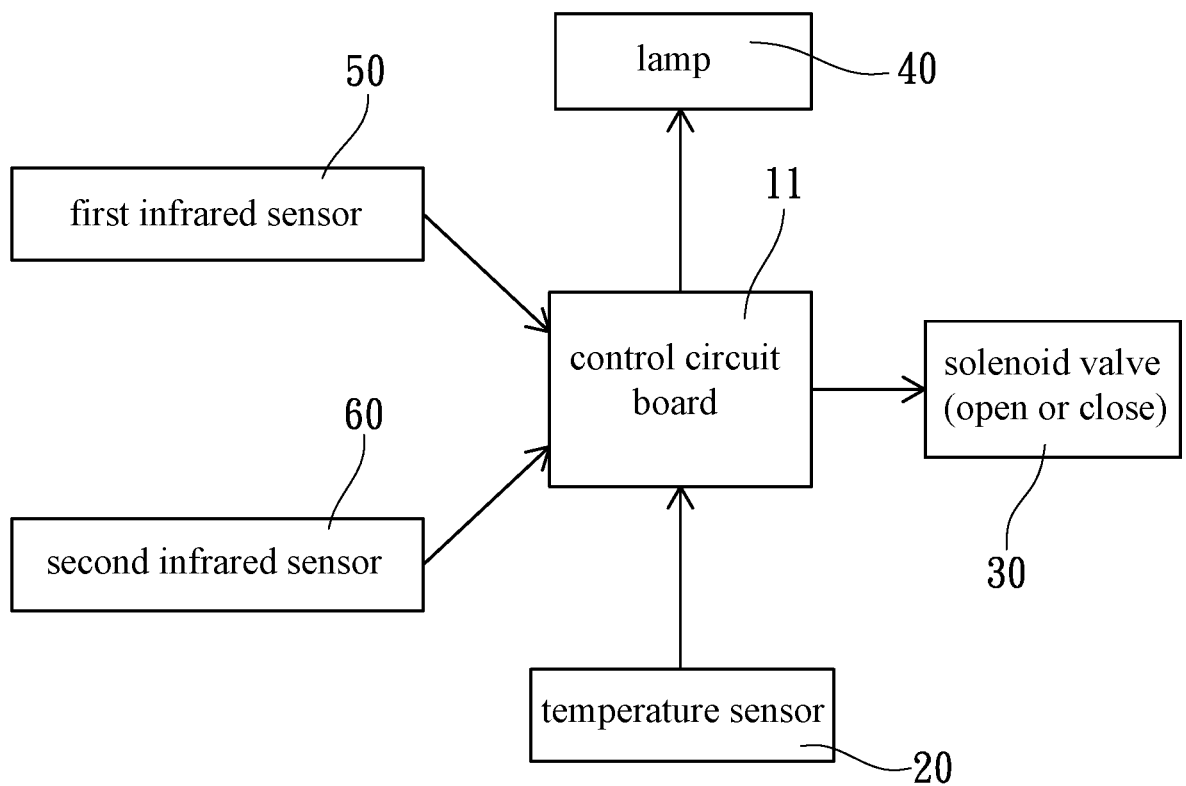
FIG. 4 is a block diagram, showing a control structure adapted to sense and control water to flow out or stop according to the present invention.

Referring to FIGS. 3 and 4, the control circuit board 11, in a general use case, will open the solenoid valve 30 when a user places their hand in front of the first infrared sensor 50 or second infrared sensor 60 to make water flow out of the faucet, and at this time, the temperature sensor 20 will sense water temperature, and the lamp 40 will emit different color light according to the water temperature.

When the user takes their hand away from the sensor 50, 60, the control circuit board 11 will close the solenoid valve 30 to make water stop flowing and the lamp 40 turn off.

Figure 5:
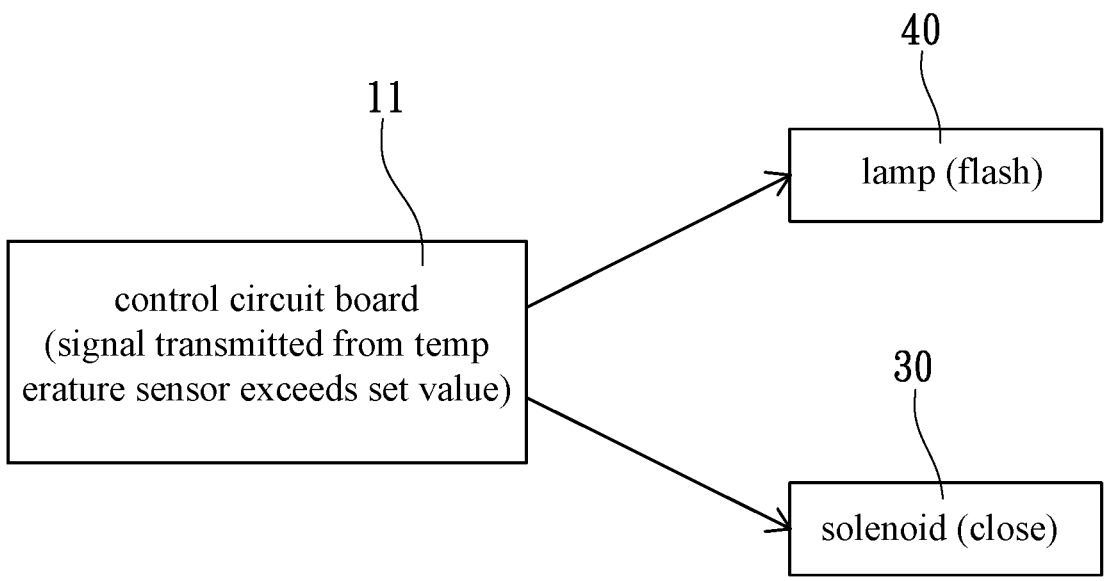
FIG. 5 is a block diagram, showing a control structure having an anti-scalding function by being adapted to sense and cut off high temperature water according to the present invention.

Referring to FIGS. 3 and 5, the activation of the anti-scalding function is described as the following: the control circuit board 11 can obtain water temperature information transmitted from the temperature sensor 20 when the solenoid valve 30 is opened to allow water to flow out of the main body 10; if the water temperature exceeds the temperature parameter value set by the control circuit board 11, the control circuit board 11 issues a command to close the solenoid valve 30 to stop water flow, thereby preventing high temperature water from scalding users, and the lamp 40 emit flashing light to warn the users, thereby avoiding being scalded. Therefore, the present invention is safe and practical.

I claim:

1. An anti-scalding water outlet device, comprising:
   a main body, adapted to allow water to flow through;
   a control circuit board, adapted to set a temperature parameter value;
   a temperature sensor, in connection with said control circuit board and adapted to sense water temperature inside said main body; and
   a solenoid valve, in connection with said control circuit board and adapted to use as a water flow switch of said main body, when said solenoid valve is opened to allow water to flow out of said main body, said control circuit board obtaining water temperature information transmitted from said temperature sensor;
   when said water temperature exceeds said set temperature parameter value, said control circuit board issuing a command to close said solenoid valve and stop water-flow of said main body, thereby preventing high temperature water from scalding a user;
   wherein a seat is configured inside said main body, and said temperature sensor is pressed to fix to a concave portion of said seat by using a screw together with a washer.

2. The device according to claim 1, wherein a hot water pipe and cold water pipe are configured on a lower side of said main body, and a cold and hot water rod is configured on a lateral side of said main body, said hot and cold rod adapted to control a mixing ratio of hot water of said hot water pipe and cold water of said cold water pipe in a rotational manner.

3. The device according to claim 1, wherein said control circuit board is further in connection with a lamp, a first infrared sensor and a second infrared sensor.

4. The device according to claim 3, wherein said lamp is an LED lamp.

5. The device according to claim 3, wherein said control circuit board is configured in a protective cover first infrared sensor, said control circuit board, first infrared sensor and protective cover are configured on one side inside said main body, and said main body allows sensing light of said first infrared sensor to penetrate it to carry out sensing.

6. The device according to claim 3, wherein one end of said main body having an end cover having a plurality of through holes, said lamp, second infrared sensor are plurality of through holes and further on said end of said main body, and said plurality of through holes allows sensing light of said second infrared sensor to pass therethrough to carry out sensing, thereby allowing users to observe the illumination of said lamp.

* * * * *